(12) United States Patent
Tachibana

(10) Patent No.: US 10,628,005 B2
(45) Date of Patent: Apr. 21, 2020

(54) IMAGE DISPLAY DEVICE, IMAGE DISPLAY METHOD, AND INFORMATION STORAGE MEDIUM

(71) Applicant: JEOL Ltd., Tokyo (JP)

(72) Inventor: Kazuhiro Tachibana, Tokyo (JP)

(73) Assignee: JEOL Ltd., Tokyo (JP)

( * ) Notice: Subject to any disclaimer, the term of this patent is extended or adjusted under 35 U.S.C. 154(b) by 399 days.

(21) Appl. No.: 15/058,449

(22) Filed: Mar. 2, 2016

(65) Prior Publication Data

US 2016/0259529 A1    Sep. 8, 2016

(30) Foreign Application Priority Data

Mar. 4, 2015 (JP) ................................. 2015-042160

(51) Int. Cl.
| | |
|---|---|
| *G06F 17/00* | (2019.01) |
| *G06F 3/0484* | (2013.01) |
| *G06F 3/0482* | (2013.01) |
| *G06F 3/0488* | (2013.01) |

(52) U.S. Cl.
CPC ........ *G06F 3/04842* (2013.01); *G06F 3/0482* (2013.01); *G06F 3/04847* (2013.01); *G06F 3/04886* (2013.01); *G06F 2203/04805* (2013.01)

(58) Field of Classification Search
CPC ............... G06F 3/04842; G06F 3/0482; G06F 2203/04805; G06F 3/04847; G06F 3/04886; H01J 37/22
USPC .......................... 715/771, 208, 764, 775, 790
See application file for complete search history.

(56) References Cited

U.S. PATENT DOCUMENTS

| | | | | |
|---|---|---|---|---|
| 8,396,740 B1* | 3/2013 | Watson | ............... | G06Q 50/163 |
| | | | | 705/412 |
| 9,652,067 B2* | 5/2017 | Yamano | ............... | G06F 3/0414 |
| 9,689,954 B2* | 6/2017 | Yang | ..................... | G01R 33/60 |
| 9,778,829 B2* | 10/2017 | VanBlon | ............ | G06F 3/04842 |

(Continued)

FOREIGN PATENT DOCUMENTS

| | | |
|---|---|---|
| JP | 2010249688 A | 11/2010 |
| JP | 2014130407 A | 7/2014 |
| WO | 2015022793 A1 | 2/2015 |

OTHER PUBLICATIONS

General Electric, "Brivo XR575 Medical Diagnostic Digital Radiography System Operation Manual", published 2013, General Electric, Revision 4, pp. 1-282.*

(Continued)

*Primary Examiner* — Stephen S Hong
*Assistant Examiner* — Matthew J Ludwig
(74) *Attorney, Agent, or Firm* — The Webb Law Firm

(57) ABSTRACT

An image display device includes: a selection screen display control section that performs a control process that displays a selection screen on a display section, a plurality of element buttons for selecting an analysis target element being arranged within the selection screen; and a sub-image display control section that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

16 Claims, 8 Drawing Sheets

(56) References Cited

U.S. PATENT DOCUMENTS

2011/0119635 A1* 5/2011 Morales .............. G06Q 10/06
715/854
2014/0285198 A1* 9/2014 Halpern .............. G01R 33/60
324/316

OTHER PUBLICATIONS

Japanese Office Action issued in Japanese Patent Application No. 2015-042160 dated Sep. 19, 2018.

* cited by examiner

FIG.11

| | | | | | | | | | | | | | | | | | He |
|---|---|---|---|---|---|---|---|---|---|---|---|---|---|---|---|---|---|
| ☐H | | | | | | | | | | | | | | | | | |
| Li | Be | | | | | | | | | | | B | C | N | O | F | Ne |
| Na | Mg | | | | | | | | | | | Al | Si | P | S | Cl | Ar |
| K | Ca | Sc | Ti | V | Cr | Mn | Fe | Co | Ni | Cu | Zn | Ga | Ge | As | Se | Br | Kr |
| Rb | Sr | Y | Zr | Nb | Mo | Tc | Ru | Rh | Pd | Ag | Cd | In | Sn | Sb | Te | I | Xe |
| Cs | Ba | | Hf | Ta | W | Re | Os | Ir | Pt | Au | Hg | Tl | Pb | Bi | Po | At | Rn |
| Fr | Ra | | | | | | | | | | | | | | | | |
| | | La | Ce | Pr | Nd | Pm | Sm | Eu | Gd | Tb | Dy | Ho | Er | Tm | Yb | Lu | |
| | | Ac | Th | Pa | U | Np | Pu | Am | Cm | Bk | Cf | Es | Fm | Md | No | Lr | |

2A C, 1A (same periodic table with cursor on Fe/Ru area)

IMAGE DISPLAY DEVICE, IMAGE DISPLAY METHOD, AND INFORMATION STORAGE MEDIUM

Japanese Patent Application No. 2015-042160, filed on Mar. 4, 2015, is hereby incorporated by reference in its entirety.

BACKGROUND OF THE INVENTION

The present invention relates to an image display device, an image display method, and an information storage medium.

When using an electron microscope that is provided with an energy dispersive X-ray spectrometer (EDS), an electron microscope that is provided with a wavelength dispersive X-ray spectrometer (WDS), an X-ray fluorescence spectrometer, or the like, qualitative analysis, quantitative analysis, or the like can be performed by using the resulting spectrum. The user can check the shape of the spectrum obtained by the analyzer, and perform quantitative analysis or qualitative analysis while designating the analysis target element and the analytical conditions for the analysis target element.

In recent years, a graphical user interface (GUI)) has been used to select the analytical conditions. For example, the wavelength dispersive X-ray spectrometer disclosed in JP-A-2010-249688 displays an analytical condition selection screen on a display device, the analytical condition selection screen being provided with a spectroscopic device selection area in which a plurality of buttons that respectively represent a plurality of spectroscopic devices are displayed in the vertical direction, and an element selection area in which a plurality of buttons that respectively represent a plurality of elements that can be analyzed by each spectroscopic device are arranged according to the periodic table. The user can select the desired spectroscopic device and the desired element by selecting an arbitrary button with an input device (e.g., mouse or keyboard).

FIGS. 11 and 12 illustrate examples of a known selection screen (GUI) 1A. The selection screen 1A is a screen for selecting an element used for X-ray analysis. As illustrated in FIG. 11, a plurality of element buttons 2A are arranged within the selection screen 1A according to the periodic table.

In the selection screen 1A in FIG. 12, when the user has clicked the element button 2A that corresponds to the element used for X-ray analysis with the mouse cursor C, the analysis target element is selected.

When selecting the element line (i.e., the type characteristic X-ray (e.g., K line, L line, and M line)) used for X-ray analysis, the element line may be selected in advance, and the element may be selected in the selection screen 1A, or the element may be designated in the selection screen 1A, and the element line may be selected thereafter, for example.

However, since the analysis target elements are arranged within the selection screen according to the periodic table, the number of element buttons is large, and each element button is normally displayed to have a small size. Therefore, the user may erroneously select an undesired element button. In particular, when the user performs an input on a touch panel, it may be difficult to accurately press the desired element button since the element button is small, or the element button that is being pressed may be hidden behind the fingertip or a touch pen. As a result, the frequency of erroneous selection may increase.

The size of the element buttons may be increased so as to facilitate an input on a touch panel. In this case, however, most of the display area may be occupied by the element buttons.

SUMMARY

Several aspects of the invention may provide an image display device, an image display method, and an information storage medium that make it possible for the user to easily determine the analytical conditions for the analysis target element.

According to a first aspect of the invention, there is provided an image display device including:

a selection screen display control section that performs a control process that displays a selection screen on a display section, a plurality of element buttons for selecting an analysis target element being arranged within the selection screen; and a sub-image display control section that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

According to a second aspect of the invention, there is provided an image display method including:

a selection screen display control step that performs a control process that displays a selection screen on a display section, a plurality of element buttons for selecting an analysis target element being arranged within the selection screen; and a sub-image display control step that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

According to a third aspect of the invention, there is provided a non-transitory computer-readable information storage medium storing a program that causes a computer to function as:

a selection screen display control section that performs a control process that displays a selection screen on a display section, a plurality of element buttons for selecting an analysis target element being arranged within the selection screen; and a sub-image display control section that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

BRIEF DESCRIPTION OF THE SEVERAL VIEWS OF THE DRAWING

FIG. 11 illustrates an example of a known selection screen.

FIG. 12 illustrates an example of a known selection screen.

Figure 1:
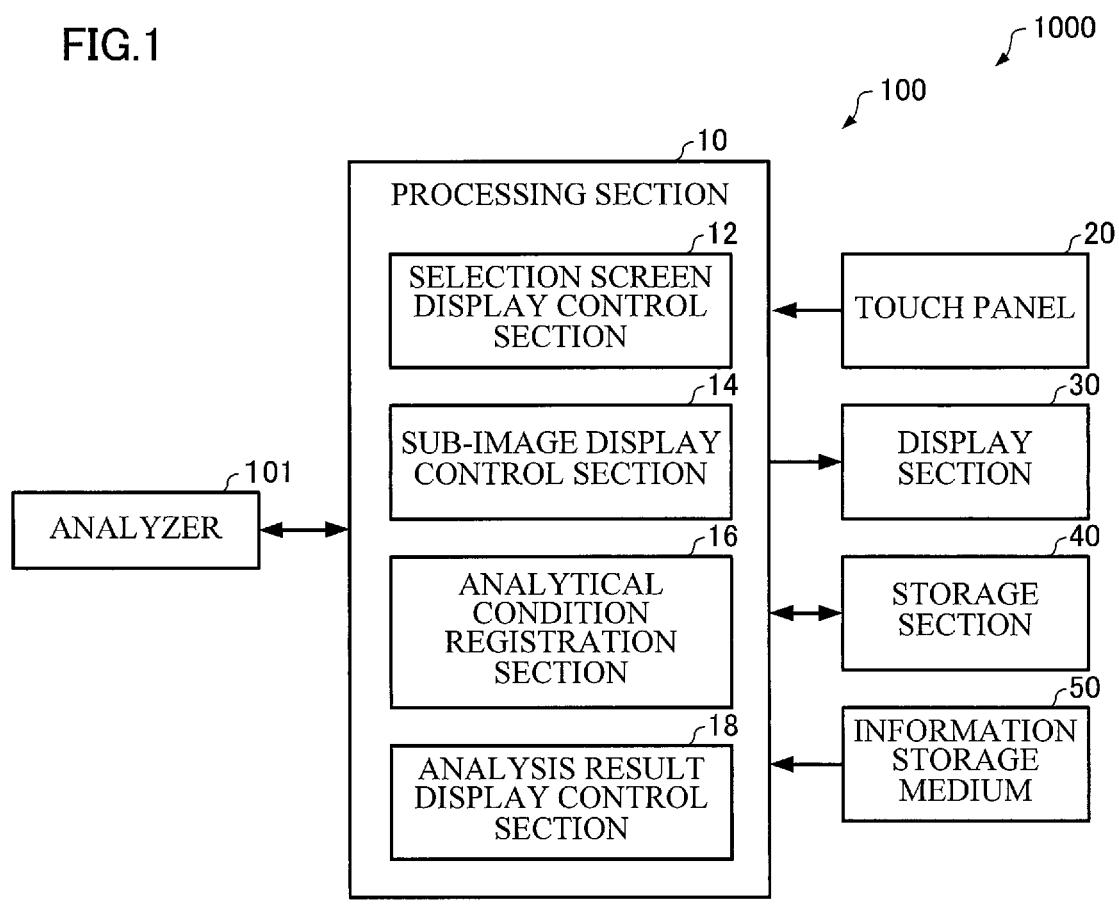
FIG. 1 is a functional block diagram illustrating an example of an analytical system that includes an image display device according to one embodiment of the invention.

DETAILED DESCRIPTION OF THE EMBODIMENT (1) According to one embodiment of the invention, an image display device includes:

a selection screen display control section that performs a control process that displays a selection screen on a display section, a plurality of element buttons for selecting an analysis target element being arranged within the selection screen; and a sub-image display control section that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

The image display device can display the element analytical conditions on the display section with a character that is larger than a character used for the element button when the user designates or checks the element analytical conditions. Therefore, the user can easily determine the analytical conditions for the analysis target element.

(2) In the image display device, the analytical condition information may include information about the type of characteristic X-ray that can be used for analysis.

This makes it possible for the user to easily determine the type of characteristic X-ray that can be used when analyzing the analysis target element.

(3) In the image display device, the analytical condition information may include information about qualitative and quantitative analytical conditions.

This makes it possible for the user to easily determine the qualitative and quantitative analytical conditions for the analysis target element.

(4) In the image display device, the analytical condition information may include information about a color assigned by map analysis.

This makes it possible for the user to easily determine the color assigned to the analysis target element by map analysis.

(5) In the image display device, the pointing means may be a touch panel provided to the display section.

This makes it possible to solve a problem in which it may be difficult to accurately press the desired element button on the display section that includes a touch panel (since the element button is small), or the element button that is being pressed may be hidden behind the fingertip or a touch pen.

(6) In the image display device, the sub-image display control section may display a plurality of the sub-images that respectively represent a plurality of pieces of the analytical condition information.

(7) The image display device may further include an analytical condition registration section that stores the analytical condition information selected by using the pointing means in the storage section.

This makes it possible for the user to check and designate the element analytical conditions.

(8) According another embodiment of the invention, an image display method includes:

a selection screen display control step that performs a control process that displays a selection screen on a display section, a plurality of element buttons for selecting an analysis target element being arranged within the selection screen; and a sub-image display control step that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

The image display method can display the element analytical conditions on the display section with a character that is larger than a character used for the element button when the user designates or checks the element analytical conditions. Therefore, the user can easily determine the analytical conditions for the analysis target element.

(9) In the image display method, the analytical condition information may include information about the type of characteristic X-ray that can be used for analysis.

(10) In the image display method, the analytical condition information may include information about qualitative and quantitative analytical conditions.

(11) In the image display method, the analytical condition information may include information about a color assigned by map analysis.

(12) In the image display method, the pointing means may be a touch panel provided to the display section.

(13) In the image display method, the sub-image display control step may display a plurality of the sub-images that respectively represent a plurality of pieces of the analytical condition information.

(14) The image display method may further include an analytical condition registration step that stores the analytical condition information selected by using the pointing means in the storage section.

(15) According to another embodiment of the invention, a non-transitory computer-readable information storage medium stores a program that causes a computer to function as:

a selection screen display control section that performs a control process that displays a selection screen on a display section, a plurality of element buttons for selecting an analysis target element being arranged within the selection screen; and a sub-image display control section that performs a control process that reads analytical condition information about an element that corresponds to an element button among the plurality of element buttons that has been selected by using pointing means from a storage section, and displays a sub-image that represents the analytical condition information with a character that is larger than a character used for the element button on the display section.

This makes it possible to display the element analytical conditions on the display section with a character that is larger than a character used for the element button when the user designates or checks the element analytical conditions. Therefore, the user can easily determine the analytical conditions for the analysis target element.

Exemplary embodiments of the invention are described in detail below with reference to the drawings. Note that the following exemplary embodiments do not unduly limit the scope of the invention as stated in the claims. Note also that all of the elements described below should not necessarily be taken as essential elements of the invention.

1. Image Display Device

An image display device according to one embodiment of the invention is described below with reference to the drawings. FIG. 1 is a functional block diagram illustrating an example of an analytical system 1000 that includes an image display device 100.

The analytical system 1000 includes the image display device 100 and an analyzer 101.

The analyzer 101 is an electron microscope that is provided with an energy dispersive X-ray spectrometer (EDS), an electron microscope that is provided with a wavelength dispersive X-ray spectrometer (WDS), an X-ray fluorescence spectrometer, or the like. An example in which the analyzer 101 is an electron microscope that is provided with an energy dispersive X-ray spectrometer (EDS) is described below.

The image display device 100 receives the measurement results (e.g., spectrum) obtained by the analyzer 101, and displays an image that represents the analysis target element and the element analytical conditions on a display section 30 when qualitative analysis, quantitative analysis, or the like is performed by using the measurement results. The image display device 100 also displays the analysis results on the display section 30, and stores the analytical conditions designated by the user in a storage section 40, for example.

The image display device 100 includes a processing section 10, a touch panel 20, the display section 30, the storage section 40, and an information storage medium 50.

The touch panel (i.e., pointing means) 20 allows the user to input operation information, and outputs the input operation information to the processing section 10.

The touch panel 20 outputs information (input information) that has been input by performing a touch operation (designation operation) on the touch panel 20 to the processing section 10. The touch panel 20 may be implemented by using a (4-wire or 5-wire) resistive film technique, a capacitive coupling technique, an ultrasonic surface acoustic wave technique, an infrared scan technique, or the like. The touch panel 20 is provided to the display area of the display section 30, and forms a touch panel display together with the display section 30. A touch operation on the touch panel 20 may be performed with a fingertip, a touch pen, or the like.

The display section 30 displays an image generated by the processing section 10. The function of the display section 30 may be implemented by an LCD, a CRT, a touch panel display that includes the touch panel 20, or the like.

The storage section 40 serves as a work area for the processing section 10. The function of the storage section 40 may be implemented by a RAM or the like. The information storage medium 50 (computer-readable medium) stores a program, data, and the like. The function of the information storage medium 50 may be implemented by an optical disk (CD or DVD), a magneto-optical disk (MO), a magnetic disk, a hard disk, a magnetic tape, a memory (ROM), or the like. The processing section 10 performs various processes according to one embodiment of the invention based on a program (data) stored in the information storage medium 50. The information storage medium 50 may store a program that causes a computer to function as each section of the processing section 10.

The storage section 40 stores information about the analytical conditions on an element basis. For example, the storage section 40 stores information about a characteristic X-ray (e.g., K line, L line, or M line) that can be used for quantitative analysis on an element basis.

The processing section 10 performs a control process that displays a selection screen that allows the user to select the analysis target element on the display section 30, a process that displays a sub-image (icon) that represents analytical condition information about the element that corresponds to the element button selected by using the touch panel 20 (or by an input through the touch panel 20) on the display section 30, the analytical condition information being represented by characters that are larger than characters used for the element button, a process that stores the analytical condition information selected by using the touch panel 20 in the storage section 40, a process that analyzes the measurement results obtained by the analyzer 101, and the like. The function of the processing section 100 may be implemented by hardware such as a processor (e.g., CPU or DSP) or an ASIC (e.g., gate array), or a program. The processing section 10 includes a selection screen display control section 12, a sub-image display control section 14, an analytical condition registration section 16, and an analysis result display control section 18.

The selection screen display control section 12 performs a control process that displays the selection screen on the display section 30, a plurality of element buttons for selecting the analysis target element being arranged within the selection screen.

The sub-image display control section 14 performs a control process that reads the analytical condition information about the element that corresponds to the element button selected by using the touch panel 20 from the storage section 40, and displays the sub-image (icon) that represents the analytical condition information with characters that are larger than characters used for the element button on the display section 30. The analytical condition information about each element is information about the characteristic X-ray (e.g., K line or L line) that can be used for quantitative analysis.

The sub-image display control section 14 may perform a control process that displays an operation button (sub-image switch button) for selectively displaying a plurality of sub-images on the display section 30.

The analytical condition registration section 16 performs a process that stores the analytical condition information selected by using the touch panel 20 (i.e., the analytical condition information displayed as the sub-image) in the storage section 40. This makes it possible to store the analytical conditions designated by the user in the storage section 40.

The analysis result display control section 18 performs a control process that displays the measurement results (e.g., EDS spectrum or EDS map analysis results) obtained by the analyzer 101 on the display section 30. The analysis result display control section 18 also performs a control process that performs analysis (e.g., quantitative analysis or qualitative analysis) on the measurement results obtained by the analyzer 101, and displays the analysis results on the display section 30, for example. The analysis result display control section 18 reads the analytical condition information stored in the storage section 40 by the analytical condition registration section 16, and performs analysis based on the analytical condition information.

2. Method

A method according to one embodiment is described below with reference to the drawings.

FIGS. 2 to 6 illustrate examples of a selection screen (graphical user interface (GUI)) 1 that is displayed on the display section 30 of the touch panel display (i.e., the display section 30 that includes the touch panel 20).

Figure 2:
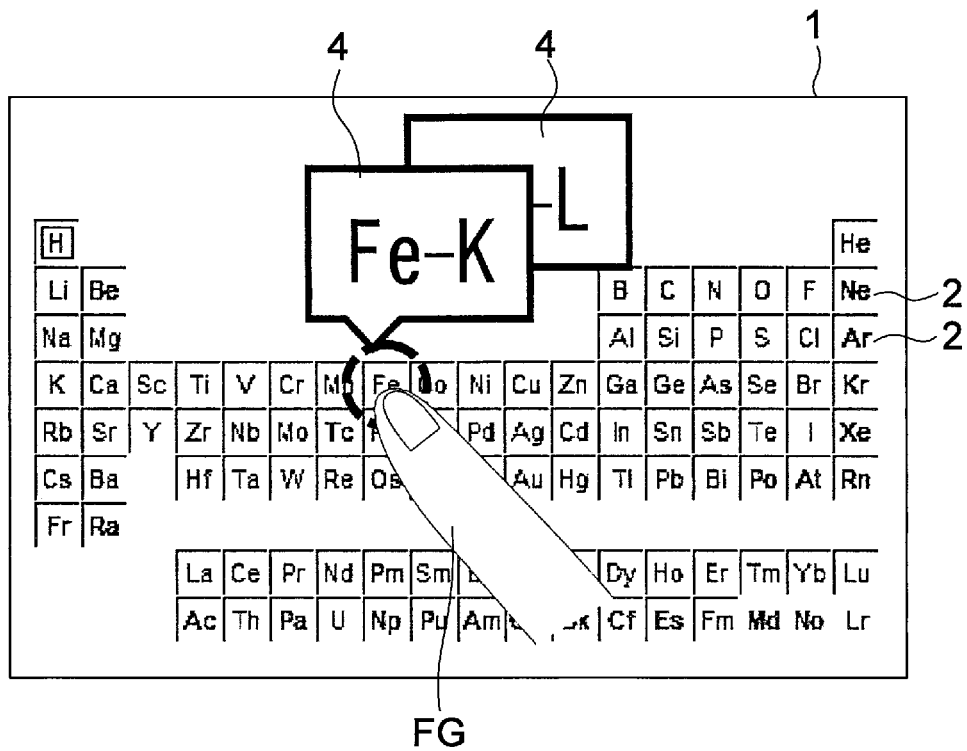
FIG. 2 illustrates an example of a selection screen that is displayed on a display section of a touch panel display.

As illustrated in FIG. 2, a plurality of element buttons 2 for selecting the analysis target element are arranged within the selection screen 1. The plurality of element buttons 2 are arranged according to the periodic table.

As illustrated in FIG. 2, the user selects the desired element button 2 by touching the desired element button 2 with the tip of a finger FG (or with a touch pen or the like). When the user has selected the desired element button 2, a sub-image (icon) 4 that represents the information about the type of characteristic X-ray that can be used for quantitative analysis of the element that corresponds to the selected element button 2 is displayed. The sub-image 4 is displayed within the selection screen 1 at a position in the vicinity of the selected element button 2. The sub-image 4 represents the information about the type of characteristic X-ray with characters that are larger than characters used for the element button 2. A plurality of sub-images 4 are displayed when a plurality of types of characteristic X-rays can be used. Specifically, the sub-image 4 is displayed corresponding to the type of characteristic X-ray. A plurality of sub-images 4 are displayed so as to at least partially overlap each other. This makes it possible to save the display area.

FIG. 2 illustrates an example in which the user has selected the Fe element button 2 by touching the Fe element button 2 with the tip of the finger FG, and the sub-images 4 that respectively represent "Fe-K line" and "Fe-L line" that can be used for Fe quantitative analysis have been displayed. When the user desires to suspend the element selection operation, the user moves the tip of the finger FG to the outside of the display area of the element button 2 without removing the tip of the finger FG from the selection screen 1. The sub-image 4 is deleted (i.e., the element selection operation is suspended) when the user has performed the above operation.

Figure 3:
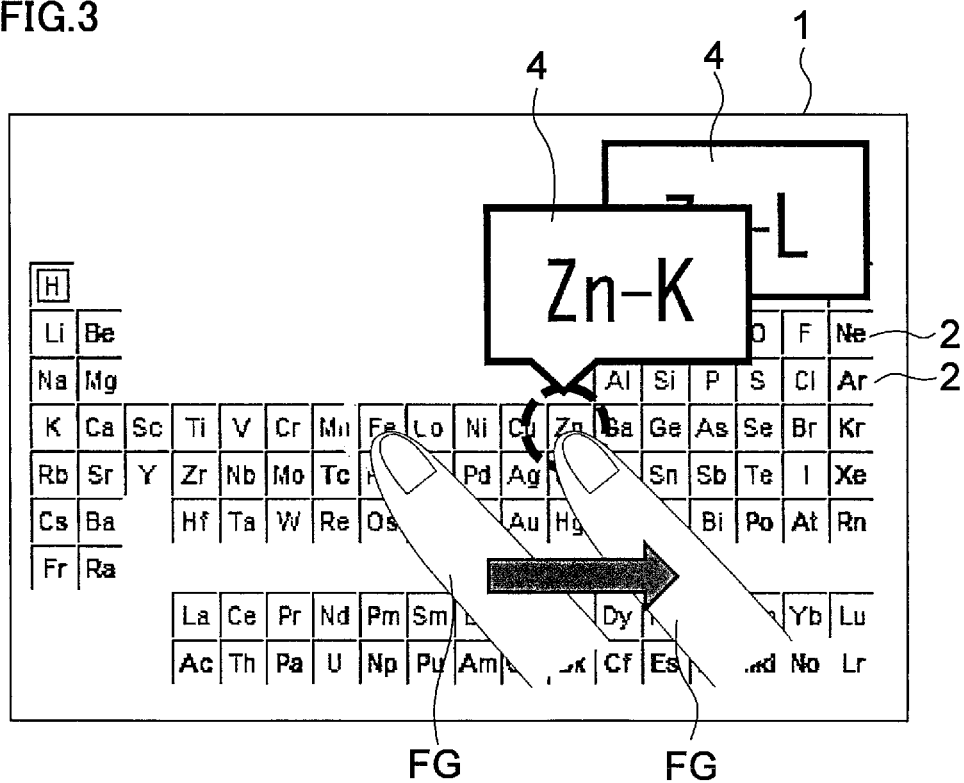
FIG. 3 illustrates an example of a selection screen that is displayed on a display section of a touch panel display.

As illustrated in FIG. 3, when the user has moved the tip of the finger FG without removing the tip of the finger FG from the selection screen 1, the element button 2 that corresponds to the position of the tip of the finger FG is sequentially selected, and the sub-image 4 that represents the information about the type of characteristic X-ray that can be used for quantitative analysis of the element that corresponds to the selected element button 2 is sequentially displayed.

FIG. 3 illustrates an example in which the user has moved the tip of the finger FG from the Fe element button 2 to the Zn element button 2 without removing the tip of the finger FG from the selection screen 1, and the sub-image 4 that represents the type of characteristic X-ray that can be used for Fe, Co, Ni, Cu, or Zn quantitative analysis has been sequentially displayed.

Figure 4:
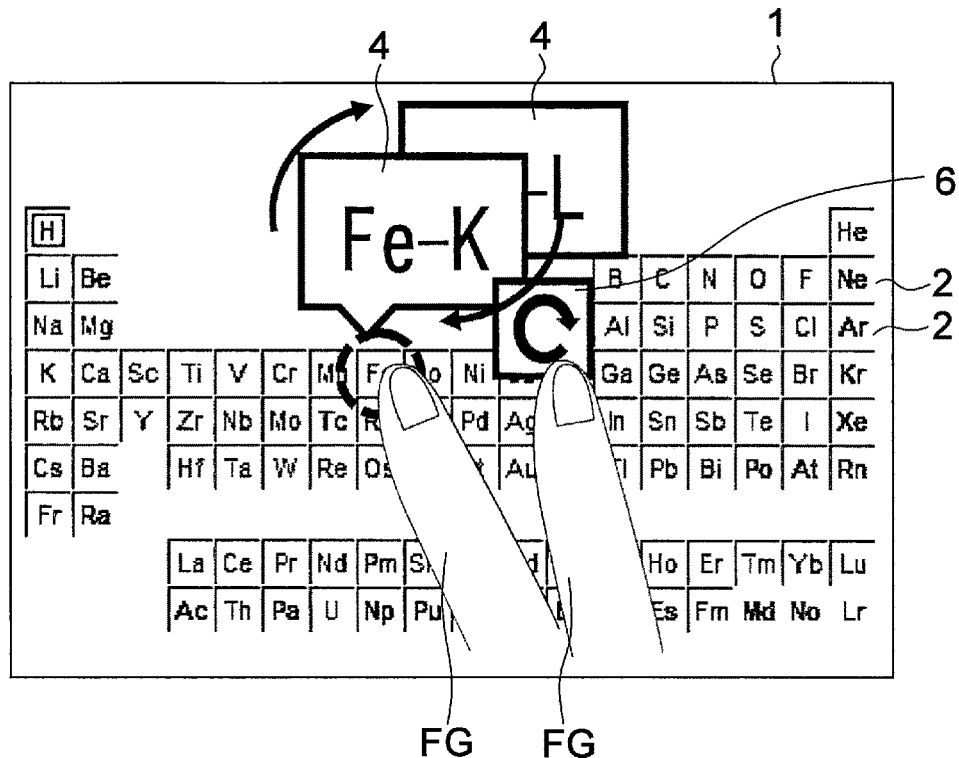
FIG. 4 illustrates an example of a selection screen that is displayed on a display section of a touch panel display.

As illustrated in FIG. 4, the operation button 6 is displayed when the user has continuously touched the element button 2 with the tip of the finger FG for a given time in a state in which the element button 2 is selected and a plurality of sub-images 4 are displayed.

Figure 5:
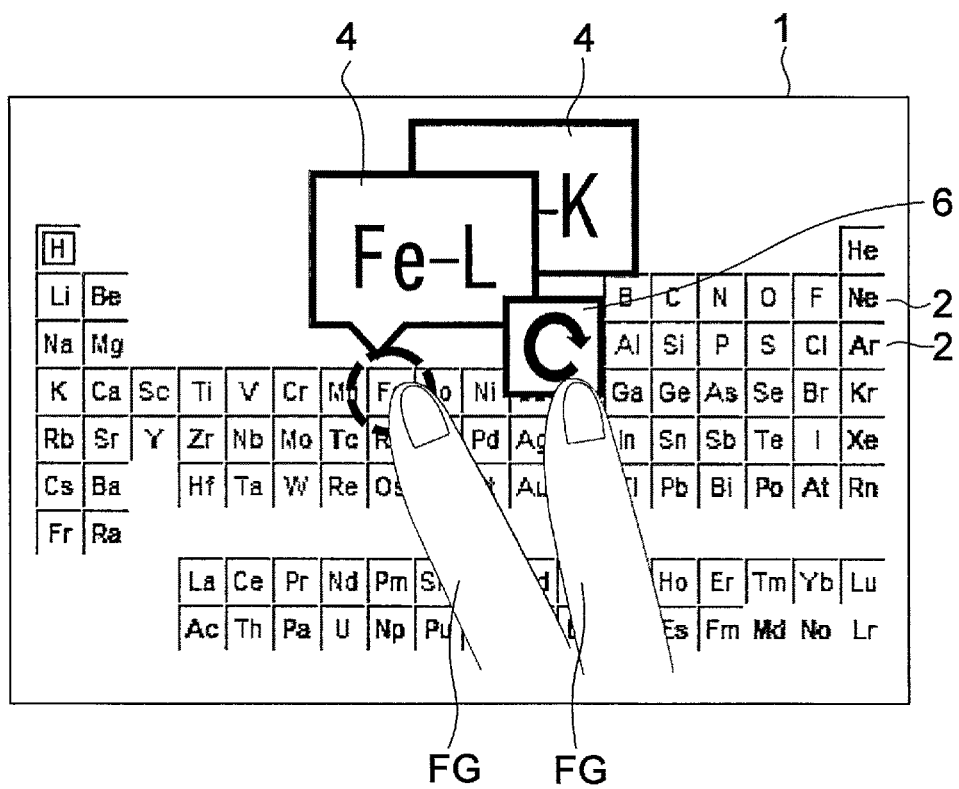
FIG. 5 illustrates an example of a selection screen that is displayed on a display section of a touch panel display.

As illustrated in FIGS. 4 and 5, the user can change the order of placement of a plurality of sub-images 4 that are displayed so as to overlap each other (i.e., change the sub-image 4 that is displayed on the front side) by touching the operation button 6 with the tip of the finger FG.

FIG. 4 illustrates an example in which the user has continuously touched the Fe element button 2 with the tip of the finger FG for a given time in a state in which the user has selected the Fe element button 2, and the sub-images 4 that respectively represent "Fe-K line" and "Fe-L line" that can be used for Fe quantitative analysis are displayed, and the operation button 6 has been displayed. When the user has touched the operation button 6 with the tip of the finger FG, the display state changes from a state in which the sub-image 4 that represents "Fe-K line" is displayed in front of the sub-image 4 that represents "Fe-L line" (see FIG. 4) to a state in which the sub-image 4 that represents "Fe-L line" is displayed in front of the sub-image 4 that represents "Fe-K line" (see FIG. 5). When the user has touched the operation button 6 again with the tip of the finger FG, the display state changes from the state illustrated in FIG. 5 to the state illustrated in FIG. 4.

The selection screen 1 is designed so that the user can designate the element that corresponds to the selected element button 2 and the characteristic X-ray (element line) represented by the sub-image 4 that is displayed on the front side by removing the tip of the finger FG from the selected element button 2 in a state in which the sub-images 4 are displayed. The image display device 100 is thus configured so that the user can designate the desired element and the desired element line at the same time. This makes it possible to reduce the number of operations required to designate the desired element and the desired element line.

For example, the user can designate Fe and the Fe-K line by removing the tip of the finger FG from the element button 2 in the state illustrated in FIG. 4, and designate Fe and the Fe-L line by removing the tip of the finger FG from the element button 2 in the state illustrated in FIG. 5.

Figure 6:
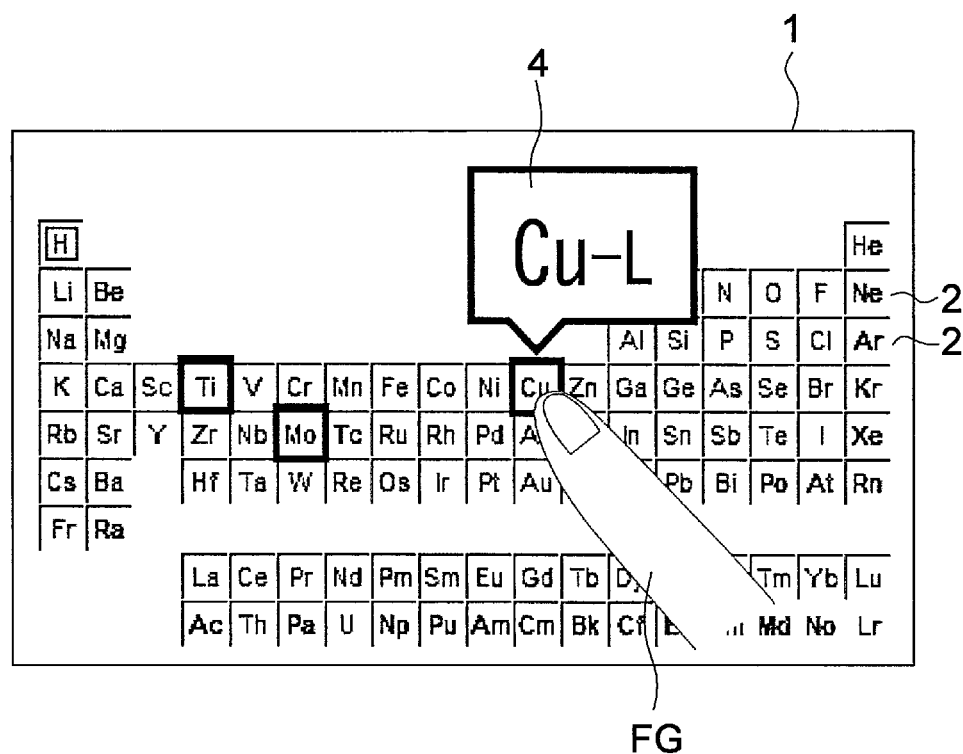
FIG. 6 illustrates an example of a selection screen that is displayed on a display section of a touch panel display.

As illustrated in FIG. 6, when the user has touched the element button 2 that corresponds to the designated element with the tip of the finger FG, the sub-image 4 that represents the designated characteristic X-ray (element line) is displayed. The image display device 100 is thus configured so that the user can easily determine the designated element line.

FIG. 6 illustrates an example in which the user has touched the Cu element button 2 (i.e., the element button 2 that corresponds to the designated element) with the tip of the finger FG, and the sub-image 4 that represents "Cu-L line" (designated characteristic X-ray) has been displayed.

3. Process

Figure 7:
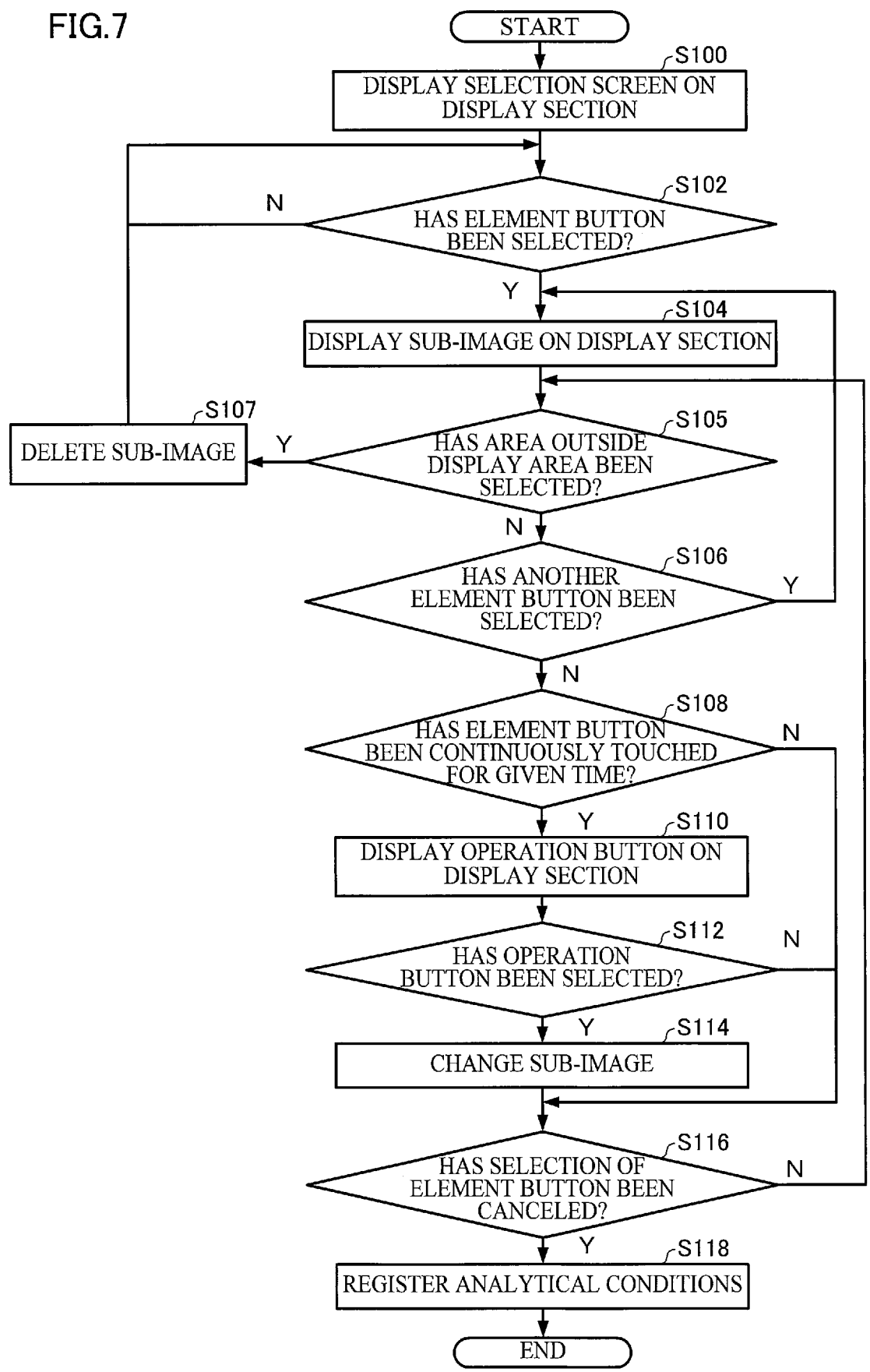
FIG. 7 is a flowchart illustrating an example of a process performed by an image display device according to one embodiment of the invention.

An example of the process performed by the image display device 100 according to one embodiment of the invention is described below. FIG. 7 is a flowchart illustrating an example of the process performed by the image display device 100.

The selection screen display control section 12 performs the control process that displays the selection screen 1

(within which a plurality of element buttons 2 for selecting the analysis target element are arranged) on the display section 30 (step S100).

The processing section 10 determines whether or not the user has selected an element button 2 among the plurality of element buttons 2 arranged within the selection screen 1 (step S102). The processing section 10 determines that the user has selected an element button 2 among the plurality of element buttons 2 when the touch panel 20 has detected that an element button 2 among the plurality of element buttons 2 has been touched (i.e., a touch operation has been performed).

When the processing section 10 has determined that the user has selected an element button 2 among the plurality of element buttons 2 ("Y" in step S102), the sub-image display control section 14 reads the analytical condition information (i.e., information about the characteristic X-ray that can be used for analysis) about the element that corresponds to the selected element button 2 from the storage section 40. The sub-image display control section 14 performs the control process that displays the sub-image 4 that represents the analytical condition information read from the storage section 40 on the display section 30, the analytical condition information being represented by characters that are larger than characters used for the element button 2 (step S104).

The processing section 10 then determines whether or not the user has selected an area outside the display area of the selected element button 2 (step S105). The processing section 10 determines that the user has selected an area outside the display area of the selected element button 2 when the touch panel 20 has detected that an area outside the display area of the selected element button 2 has been touched. When the processing section 10 has determined that the user has selected an area outside the display area of the selected element button 2 ("Y" in step S105), the sub-image display control section 14 deletes the sub-image that is being displayed (step S107), and waits for selection of another element button 2 (step S102).

When the processing section 10 has determined that the user has not selected an area outside the display area of the selected element button 2 ("N" in step S105), the processing section 10 determines whether or not the user has selected another element button 2 that differs from the selected element button 2 (step S106). The processing section 10 determines that the user has selected another element button 2 when the touch panel 20 has detected that another element button 2 has been touched.

When the processing section 10 has determined that the user has selected another element button 2 ("Y" in step S106), the sub-image display control section 14 performs the control process that displays the analytical condition information about the element that corresponds to the element button 2 (i.e., the other element button 2) currently selected by the user on the display section 30 (step S104).

When the processing section 10 has determined that the user has not selected another element button 2 ("N" in step S106), the processing section 10 determines whether or not the user has continuously touched a specific element button 2 with the tip of the finger FG for a given time (step S108).

When the processing section 10 has determined that the user has continuously touched a specific element button 2 with the tip of the finger FG for a given time ("Y" in step S108), the sub-image display control section 14 performs the control process that displays the operation button 6 on the display section 30 (step S110).

The processing section 10 then determines whether or not the user has selected the operation button 6 (step S112). The processing section 10 determines that the user has selected the operation button 6 when the touch panel 20 has detected that the operation button 6 has been touched. When the processing section 10 has determined that the user has selected the operation button 6 ("Y" in step S112), the sub-image display control section 14 performs the control process that changes the order of placement of a plurality of sub-images 4 that are displayed so as to overlap each other, and displays the plurality of sub-images 4 on the display section 30 so that the sub-image 4 that is displayed on the front side is changed (step S114).

When the sub-image display control section 14 has performed the control process that displays the plurality of sub-images 4 on the display section 30 so that the sub-image 4 that is displayed on the front side is changed (step S114), and the processing section 10 has determined that the user has not continuously touched a specific element button 2 with the tip of the finger FG for a given time ("N" in step S108), or has determined that the user has not selected the operation button 6 ("N" in step S112), the processing section 10 determines whether or not the user has canceled the selection of the element button 2 (step S116). The processing section 10 determines that the user has canceled the selection of the element button 2 when the touch panel 20 has detected that the selection of the element button 2 has been canceled (i.e., the selected element button 2 is no longer touched).

When the processing section 10 has determined that the user has not canceled the selection of the element button 2 ("N" in step S116), the processing section 10 performs the steps S105, S106, S108, S110, S112, S114, and S116 again.

When the processing section 10 has determined that the user has canceled the selection of the element button 2 ("Y" in step S116), the analytical condition registration section 16 stores the analytical condition information selected by using the touch panel 20 in the storage section 40 (step S118). Specifically, the analytical condition registration section 16 stores the information about the element that corresponds to the element button 2 for which the selection has been canceled and the information about the characteristic X-ray that corresponds to the sub-image 4 that has been displayed on the front side in the storage section 40.

The analysis result display control section 18 reads the analytical condition information stored in the storage section 40, and performs analysis (e.g., quantitative analysis or qualitative analysis) on the measurement results obtained by the analyzer 101 based on the analytical condition information (analytical conditions). The analysis result display control section 18 performs the control process that displays the analysis results on the display section 30.

The image display device 100 has the following features, for example.

The image display device 100 is configured so that the selection screen display control section 12 performs the control process that displays the selection screen 1 (within which a plurality of element buttons 2 for selecting the analysis target element are arranged) on the display section 30, and the sub-image display control section 14 performs the control process that reads the analytical condition information about the element that corresponds to the element button 2 selected by using the touch panel 20 from the storage section 40, and displays the sub-image 4 that represents the analytical condition information with characters that are larger than characters used for the element button 2 on the display section 30. This makes it possible to display the element analytical conditions on the display section 30 with characters that are larger than characters used for the element button when the user designates or checks the element analytical conditions. Therefore, the user can easily determine the analytical conditions for the analysis target element. The image display device 100 can thus reduce the occurrence of a situation in which the user makes an erroneous designation. Since the selection screen 1 is designed to allow an easy input even when the display area is decreased, it is possible to reduce the size of the selection screen 1, and save the display area. It is also possible to solve a problem in which it may be difficult to accurately press the desired element button on the display section 30 that includes the touch panel 20 (since the element button is small), or the element button that is being pressed may be hidden behind the fingertip or a touch pen.

The image display device 100 is configured so that the sub-image display control section 14 displays a plurality of pieces of analytical condition information respectively within a plurality of sub-images 4. The image display device 100 is configured to display a plurality of sub-images 4 on the display section 30 so as to at least partially overlap each other. This makes it possible to save the display area.

The image display device 100 is configured so that the analytical condition registration section 16 stores the analytical condition information selected by using the touch panel 20 in the storage section 40. The image display device 100 is thus configured so that the user can check the element analytical condition information, and designate (record) the element analytical conditions.

An image display method according to one embodiment of the invention includes a step (selection screen display control step, step S100) that performs the control process that displays the selection screen 1 (within which a plurality of element buttons 2 for selecting the analysis target element are arranged) on the display section 30, and a step (sub-image display control step, step S104) that performs the control process that reads the analytical condition information about the element that corresponds to the element button 2 selected by using the touch panel 20 from the storage section 40, and displays the sub-image 4 that represents the analytical condition information with a character that is larger than a character used for the element button 2 on the display section 30. Therefore, as described above, the user can easily determine the analytical conditions for the analysis target element.

A program according to one embodiment of the invention causes a computer to function as the selection screen display control section 12 that performs the control process that displays the selection screen 1 (within which a plurality of element buttons 2 for selecting the analysis target element are arranged) on the display section 30, and the sub-image display control section 14 performs the control process that reads the analytical condition information about the element that corresponds to the element button 2 selected by using the touch panel 20 from the storage section 40, and displays the sub-image 4 that represents the analytical condition information with a character that are a character used for the element button 2 on the display section 30. Therefore, as described above, the user can easily determine the analytical conditions for the analysis target element.

4. Modifications

Modifications of the image display device according to one embodiment of the invention are described below. Note that the following description focuses on the differences from the image display device according to one embodiment of the invention, and description of identical features is omitted.

(1) First Modification

Figure 8:
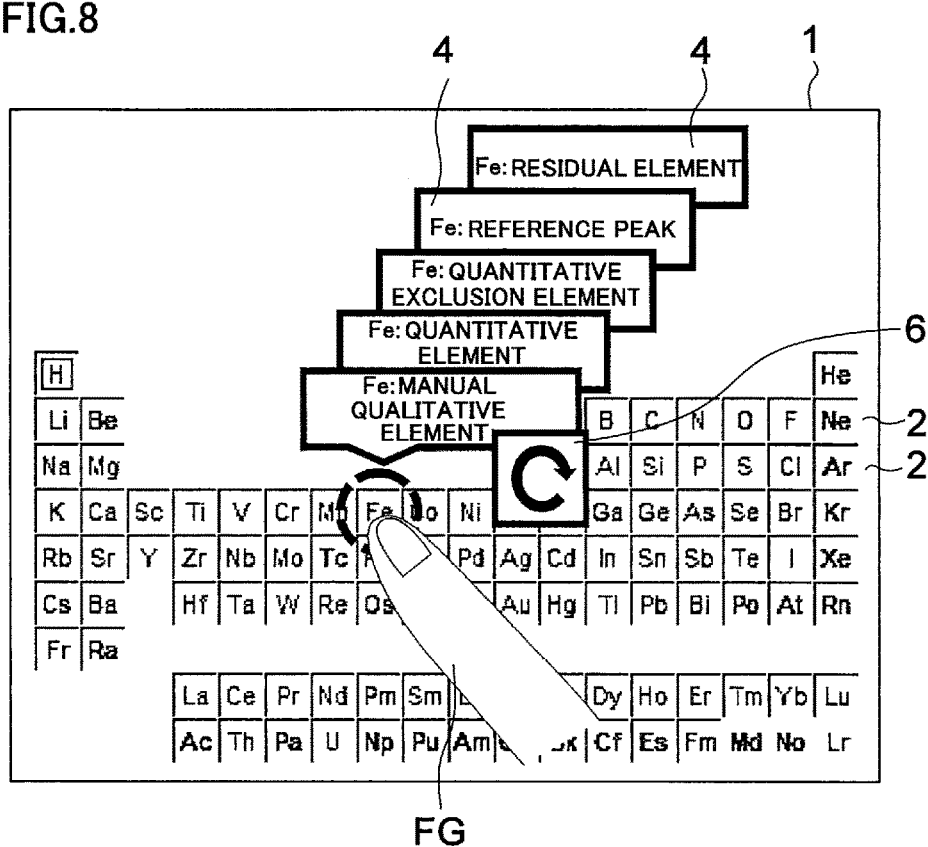
FIG. 8 illustrates an example of a selection screen that is displayed on a display section of a touch panel display.

A first modification is described below. The above embodiment has been described taking an example in which the analytical condition information is information about the type of characteristic X-ray that can be used for quantitative analysis. In the first modification, the analytical condition information is information about the analytical conditions for qualitative analysis and quantitative analysis. FIG. 8 illustrates an example of the selection screen 1 that is displayed on the display section 30 of the touch panel display.

As illustrated in FIG. 8, when the user has selected the desired element button 2 by touching the desired element button 2 with the tip of the finger FG, the sub-images 4 that represent qualitative and quantitative analytical condition information about the element that corresponds to the selected element button 2 are displayed.

FIG. 8 illustrates an example in which the user has selected the Fe element button 2 by touching the Fe element button 2 with the tip of the finger FG, and the sub-images 4 that represent the qualitative and quantitative analytical conditions for Fe have been displayed. In the example illustrated in FIG. 8, the sub-images 4 that respectively represent "MANUAL QUALITATIVE ELEMENT", "QUANTITATIVE ELEMENT", "QUANTITATIVE EXCLUSION ELEMENT", "REFERENCE PEAK", and "RESIDUAL ELEMENT" as the qualitative and quantitative analytical conditions are displayed.

The term "manual qualitative element" refers to an element registered by the user as a qualitative element. The term "quantitative element" refers to an element for which a quantitative value is registered in advance. For example, when the user has selected the sub-image 4 that represents "QUANTITATIVE ELEMENT", a quantitative value input screen (not illustrated in FIG. 8) that allows the user to register the quantitative value is displayed. The term "quantitative exclusion element" refers to an element that is excluded from the target of quantitative analysis (quantitative calculations). The term "reference peak" means that the element is used as a reference peak for quantitative calculations. Specifically, when the selected element is used as a reference peak, a quantitative calculation process that calculates the ratio of other elements based on the selected element (=1) (element line intensity) is performed. The term "residual element" refers to an element that is excluded from the target of quantitative analysis (quantitative calculations), and set to be a residue after quantitative analysis has been performed on other elements.

The process performed by the image display device according to the first modification is the same as the process performed by the image display device 100 (see FIG. 7), except that the sub-image display control section 14 performs the control process that reads the analytical condition information (qualitative and quantitative analytical condition information) about the element that corresponds to the selected element button 2 from the storage section 40, and displays the sub-image 4 that represents the analytical condition information with characters that are larger than characters used for the element button 2 on the display section 30 (step S104). Therefore, further description is omitted.

According to the first modification, the user can easily determine the qualitative and quantitative analytical conditions for the analysis target element.

(2) Second Modification

Figure 9:
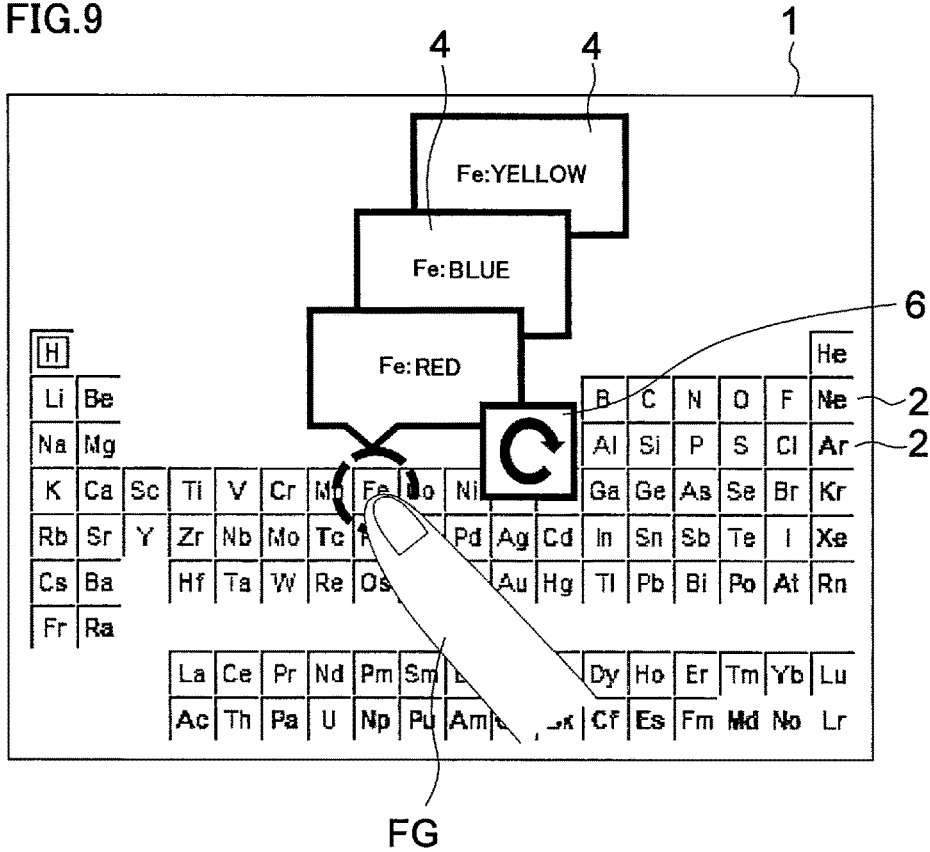
FIG. 9 illustrates an example of a selection screen that is displayed on a display section of a touch panel display.

A second modification is described below. The above embodiment has been described taking an example in which the analytical condition information is information about the type of characteristic X-ray that can be used for quantitative analysis. In the second modification, the analytical condition information is information about a color assigned by map analysis (EDS mapping). FIG. 9 illustrates an example of the selection screen 1 that is displayed on the display section 30 of the touch panel display.

As illustrated in FIG. 9, when the user has selected the desired element button 2 by touching the desired element button 2 with the tip of the finger FG, the sub-image 4 that represents the information about the color assigned by map analysis to the element that corresponds to the selected element button 2 is displayed.

FIG. 9 illustrates an example in which the user has selected the Fe element button 2 by touching the Fe element button 2 with the tip of the finger FG, and the sub-image 4 that represents "RED" that is the color assigned to Fe by map analysis has been displayed. The sub-images 4 that respectively represent "BLUE" and "YELLOW" that can be assigned to Fe are also displayed.

The process performed by the image display device according to the second modification is the same as the process performed by the image display device 100 (see FIG. 7), except that the sub-image display control section 14 performs the control process that reads the analytical condition information (information about the color assigned by map analysis) about the element that corresponds to the selected element button 2 from the storage section 40, and displays the sub-image 4 that represents the analytical condition information with characters that are larger than characters used for the element button 2 on the display section 30 (step S104). Therefore, further description is omitted.

According to the second modification, the user can easily determine the color assigned by map analysis.

(3) Third Modification

Figure 10:
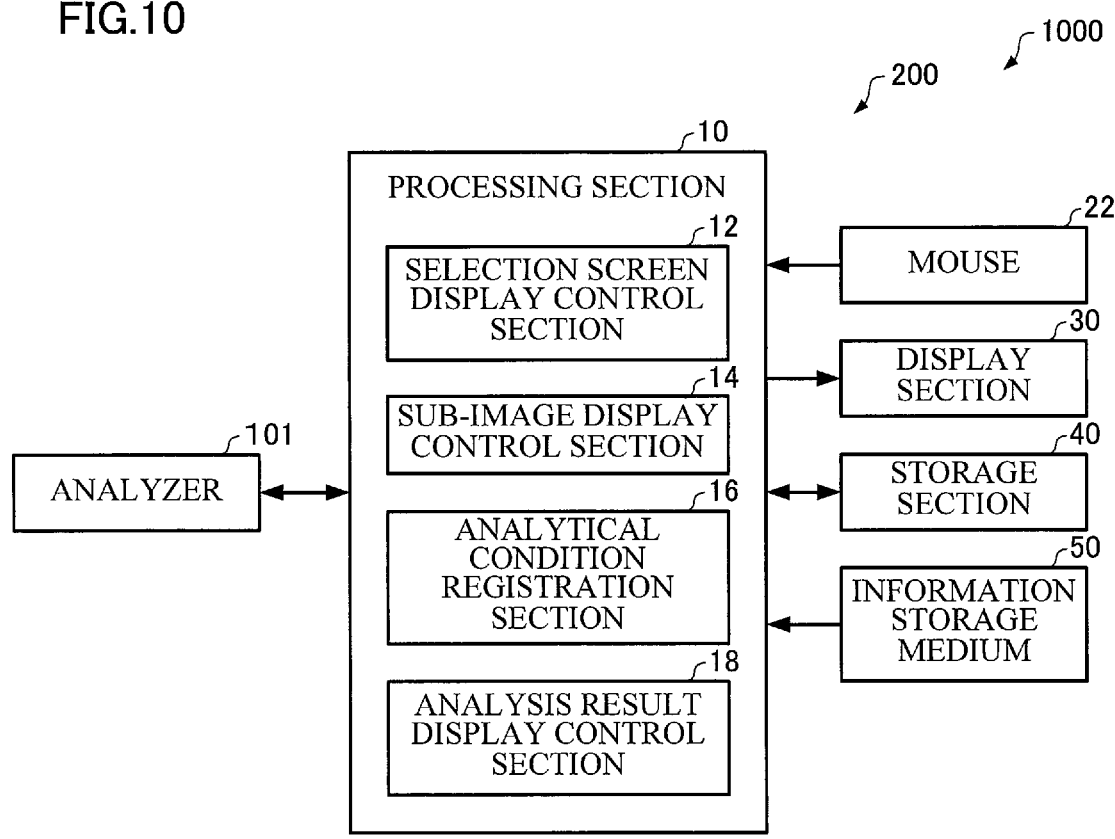
FIG. 10 is a functional block diagram illustrating an example of an analytical system that includes an image display device according to a third modification.

A third modification is described below. FIG. 10 is a functional block diagram illustrating an example of an analytical system that includes an image display device 200 according to the third modification. The elements of the image display device 200 according to the third modification that have the same function as those of the image display device 100 are indicated by the same reference signs (symbols), and description thereof is omitted.

As illustrated in FIG. 1, the image display device 100 utilizes the touch panel 20 as the pointing means. On the other hand, as illustrated in FIG. 10, the image display device 200 utilizes a mouse 22 as the pointing means.

In the example in FIG. 2, the user selects the desired element button 2 by operating the mouse 22 so that the mouse cursor is situated over the desired element button 2, and the sub-image 4 that represents the information about the type of characteristic X-ray that can be used for quantitative analysis of the element that corresponds to the selected element button 2 is displayed.

Alternatively, in the example in FIG. 3, when the user has moved the mouse cursor, the element button 2 that corresponds to the position of the mouse cursor is sequentially selected, and the sub-image 4 that represents the information about the type of characteristic X-ray that can be used for quantitative analysis of the element that corresponds to the selected element button 2 is sequentially displayed.

When the mouse 22 is used as the pointing means, the operation button 6 illustrated in FIGS. 4 and 5 is not displayed. The user can change the order of placement of a plurality of sub-images 4 that are displayed so as to overlap each other (i.e., change the sub-image 4 that is displayed on the front side) by rotating the wheel of the mouse 22.

The user can designate the element that corresponds to the selected element button 2 and the characteristic X-ray (element line) represented by the sub-image 4 that is displayed on the front side by clicking the selected element button 2 with the mouse 22. In the example illustrated in FIG. 6, when the user has operated the mouse 22 so that the mouse cursor is situated over the element button 2 that corresponds to the designated element, the sub-image 4 that represents the designated characteristic X-ray (element line) is displayed.

The image display device 200 can achieve the same advantageous effects as those achieved by the image display device 100.

The invention is not limited to the above embodiments. Various modifications and variations may be made without departing from the scope of the invention.

Although the above embodiments and modifications illustrate an example in which the analytical system 1000 includes the image display device 100 or 200 and the analyzer 101, the image display device according to the invention need not necessarily form a system together with the analyzer. For example, the image display device according to the invention may acquire measurement result data (e.g., EDS or WDS measurement result data) through an information storage medium or a network, and perform the above process.

Note that the above embodiments and modifications are merely examples, and the invention is not limited to the above embodiments and modifications. For example, the above embodiments and modifications may be appropriately combined.

The invention includes various other configurations substantially the same as the configurations described in connection with the above embodiments (e.g., a configuration having the same function, method, and results, or a configuration having the same objective and effects). The invention also includes a configuration in which an unsubstantial section (element) described in connection with the above embodiments is replaced by another section (element). The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. An image display device comprising:
   a display section on which a selection screen is displayed,
      a plurality of element buttons for selecting an analysis target element to be used for X-ray analysis being arranged within the selection screen according to a periodic table of elements;
   pointing means for selecting the element buttons, wherein the pointing means is a touch panel;
   a storage section that stores analytical condition information about a plurality of elements included in the periodic table of elements that respectively correspond to the element buttons, wherein the analytical condition information includes information about types of characteristic X-rays of a plurality of elements; and a processor, wherein the processor performs a control process that displays the selection screen on the display section by implementing a program stored in the storage section;

wherein, when an element button among the element buttons is selected by using the pointing means, the processor:

performs a first control process that reads the analytical condition information about the analysis target element that corresponds to the selected element button from the storage section, and displays a plurality of sub-images on the display section, wherein each of the plurality of sub-images is associated with the read analytical condition information about the analysis target element, wherein each of the plurality of sub-images includes a character that represents a type of characteristic X-ray of the analysis target element that corresponds to the selected element button, wherein the characters included in the sub-images are larger than characters used for the element buttons on the display section, and wherein a first sub-image that includes a first character that represents a first type of characteristic X-ray of the analysis target element is displayed in front of a second sub-image that includes a second character that represents a second type of characteristic X-ray of the analysis target element;

wherein, when the pointing means detects a continuous touch to the selected element button for a time period, the processor performs processing for causing the display section to display an operation button for selecting between the first sub-image and the second sub-image;

wherein, after the pointing means detects the continuous touch to the selected element button for the time period, when the pointing means detects a removal of the continuous touch from the selected element button, the processor stores the type of characteristic X-ray of the analysis target element associated with a selected sub-image in the storage section, wherein the selected sub-image corresponds to the first sub-image or the second sub-image that is displayed in front of the selection screen based on whether the operation button was selected; and wherein the processor:

performs a second control process that displays measurement results obtained by an electron microscope on the display section, and performs a third control process that performs X-ray analysis on the measurement results obtained by the electron microscope based on the type of characteristic X-ray of the analysis target element associated with the selected sub-image, and displays a result of the X-ray analysis on the display section.

2. The image display device as defined in claim 1, wherein the analytical condition information includes information about a type of characteristic X-ray that can be used for X-ray analysis, wherein the X-ray analysis includes qualitative analysis or quantitative analysis.

3. The image display device as defined in claim 1, wherein the analytical condition information includes information about qualitative and quantitative analytical conditions.

4. The image display device as defined in claim 1, wherein the analytical condition information includes information about a color assigned by map analysis by an energy dispersive X-ray spectrometer (EDS) or map analysis by a wavelength dispersive X-ray spectrometer (WDS).

5. The image display device as defined in claim 1, wherein the processor performs a control process that displays a plurality of the sub-images that respectively represent a plurality of pieces of the analytical condition information by implementing the program stored in the storage section.

6. The image display device as defined in claim 1, wherein the storage section stores the analytical condition information selected by using the pointing means; and wherein the processor performs a control process that causes the storage section to store the analytical condition information selected by using the pointing means in the storage section by implementing the program stored in the storage section.

7. The image display device of claim 1, wherein, when the operation button is selected by using the pointing means, the processor causes the second sub-image to be displayed in front of the first sub-image and the processor stores the type of characteristic X-ray of the analysis target element associated with the second sub-image after a second time period.

8. A method for displaying an image comprising:

causing, with at least one processor, a selection screen to be displayed on a display section, a plurality of element buttons for selecting an analysis target element to be used for X-ray analysis being arranged within the selection screen according to a periodic table of elements;

reading, with at least one processor and from a storage section that stores analytical condition information about a plurality of elements included in the periodic table of elements that respectively correspond to the element buttons, wherein the analytical condition information about the plurality of elements comprises information about types of characteristic X-rays of the plurality of elements, and wherein the read analytical condition information comprises information about the analysis target element that corresponds to an element button among the plurality of element buttons that has been selected by using pointing means from a storage section when the element button among the plurality of element buttons is selected, wherein the pointing means is a touch panel; and causing, with at least one processor, the display section to display a plurality of sub-images on the display section, wherein each of the sub-images is associated with the read analytical condition information about the analysis target element, wherein each of the sub-images includes a character that represents a type of characteristic X-ray of the analysis target element that corresponds to the selected element button, wherein the characters included in the sub-images are larger than characters used for the element buttons on the display section, wherein a first sub-image that includes a first character that represents a first type of characteristic X-ray of the analysis target element is displayed in front of a second sub-image that includes a second character that represents a second type of characteristic X-ray of the analysis target element; and performing, with at least one processor, processing for causing the display section to display an operation button for selecting between the first sub-image and the second sub-image based on the pointing means detecting a continuous touch to the selected element button for a time period;

storing, with at least one processor, a type of characteristic X-ray of the analysis target element associated with a selected sub-image in the storage section based on the pointing means detecting a removal of the continuous touch from the selected element button after the pointing means detects the continuous touch to the selected element button for the time period, wherein the selected sub-image corresponds to the first sub-image or the second sub-image that is displayed in front of the selection screen based on whether the operation button was selected;

causing, with at least one processor, the display section to display measurement results obtained by an electron microscope on the display section;

performing, with at least one processor, X-ray analysis on the measurement results obtained by the electron microscope based on the type of characteristic X-ray of the analysis target element associated with the selected sub-image; and causing, with at least one processor, the display section to display a result of the X-ray analysis on the display section.

9. The method as defined in claim 8, wherein the analytical condition information includes information about a type of characteristic X-ray that can be used for X-ray analysis, wherein the X-ray analysis includes qualitative analysis or quantitative analysis.

10. The method as defined in claim 8, wherein the analytical condition information includes information about qualitative and quantitative analytical conditions.

11. The method as defined in claim 8, wherein the analytical condition information includes information about a color assigned by map analysis by an energy dispersive X-ray spectrometer (EDS) or map analysis by a wavelength dispersive X-ray spectrometer (WDS).

12. The method as defined in claim 8, wherein the sub-image display control step displays a plurality of the sub-images that respectively represent a plurality of pieces of the analytical condition information.

13. The method as defined in claim 8, further comprising:
an analytical condition registration step that stores the analytical condition information selected by using the pointing means in the storage section.

14. The method of claim 8, further comprising:
causing the second sub-image to be displayed in front of the first sub-image and storing the type of characteristic X-ray of the analysis target element associated with the second sub-image after a second time period based on the operation button being selected.

15. A non-transitory computer-readable information storage medium storing a program that causes a computer to:
cause a selection screen to be displayed on a display section, a plurality of element buttons for selecting an analysis target element to be used for X-ray analysis being arranged within the selection screen;
read, from a storage section that stores analytical condition information about a plurality of elements included in a periodic table of elements that respectively correspond to the element buttons, wherein the analytical condition information comprises information about types of characteristic X-rays of the plurality of elements, wherein the read analytical condition information comprises information about the analysis target element that corresponds to an element button among the plurality of element buttons that has been selected by using pointing means from the storage section based on the element button among the plurality of element buttons being selected, and wherein the pointing means is a touch panel; and cause the display section to display a plurality of sub-images on the display section, wherein each of the sub-images is associated with the analytical condition information about the analysis target element, wherein each of the sub-images includes a character that represents a type of characteristic X-ray of the analysis target element that corresponds to the selected element button, wherein the characters included in the sub-images are larger than characters used for the element buttons on the display section, and wherein a first sub-image that includes a first character that represents a first type of characteristic X-ray of the analysis target element is displayed in front of a second sub-image that includes a second character that represents a second type of characteristic X-ray of the analysis target element;

perform processing for causing the display section to display an operation button for selecting between the first sub-image and the second sub-image based on the pointing means detecting a continuous touch to the selected element button for a time period;

store a type of characteristic X-ray of the analysis target element associated with a selected sub-image in the storage section based on the pointing means detecting a removal of the continuous touch from the selected element button after the pointing means detects the continuous touch to the selected element button for the time period, wherein the selected sub-image corresponds to the first sub-image or the second sub-image that is displayed in front of the selection screen based on whether the operation button was selected;

cause the display section to display measurement results obtained by an electron microscope on the display section;

perform X-ray analysis on the measurement results obtained by the electron microscope based on the type of characteristic X-ray of the analysis target element associated with the selected sub-image; and causing, with at least one processor, cause the display section to display a result of the X-ray analysis on the display section.

16. The non-transitory computer-readable information storage medium of claim 15, wherein the program further causes the computer to:
cause the second sub-image to be displayed in front of the first sub-image and store the type of characteristic X-ray of the analysis target element associated with the second sub-image after a second time period based on the operation button being selected.

* * * * *

UNITED STATES PATENT AND TRADEMARK OFFICE
CERTIFICATE OF CORRECTION

PATENT NO. : 10,628,005 B2
APPLICATION NO. : 15/058449
DATED : April 21, 2020
INVENTOR(S) : Kazuhiro Tachibana It is certified that error appears in the above-identified patent and that said Letters Patent is hereby corrected as shown below:

In the Claims

Column 18, Line 48, Claim 15, before "cause" delete "causing, with at least one processor,"

Signed and Sealed this
Tenth Day of November, 2020

Andrei Iancu
*Director of the United States Patent and Trademark Office*